Oct. 19, 1965   J. D. CANTONI   3,212,544
DRUPE HALVING APPARATUS
Filed July 19, 1962   6 Sheets-Sheet 3
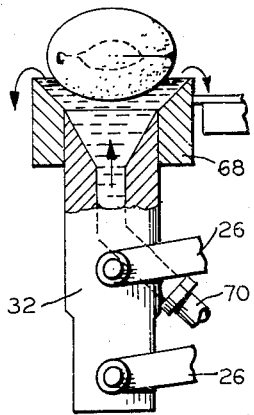
FIG_3
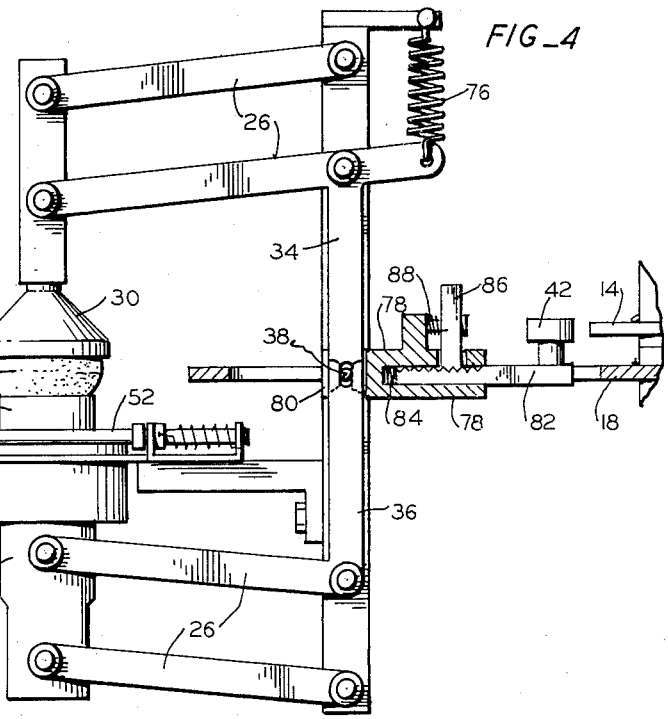
FIG_4
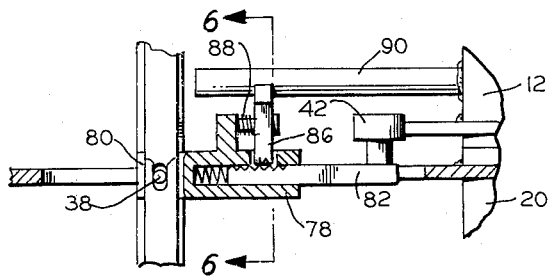
FIG_5
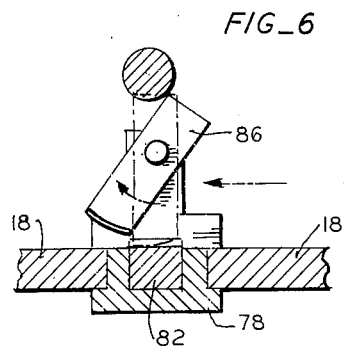
FIG_6
INVENTOR.
JOHN D. CANTONI
BY
*Naylor & Neal*
ATTORNEYS

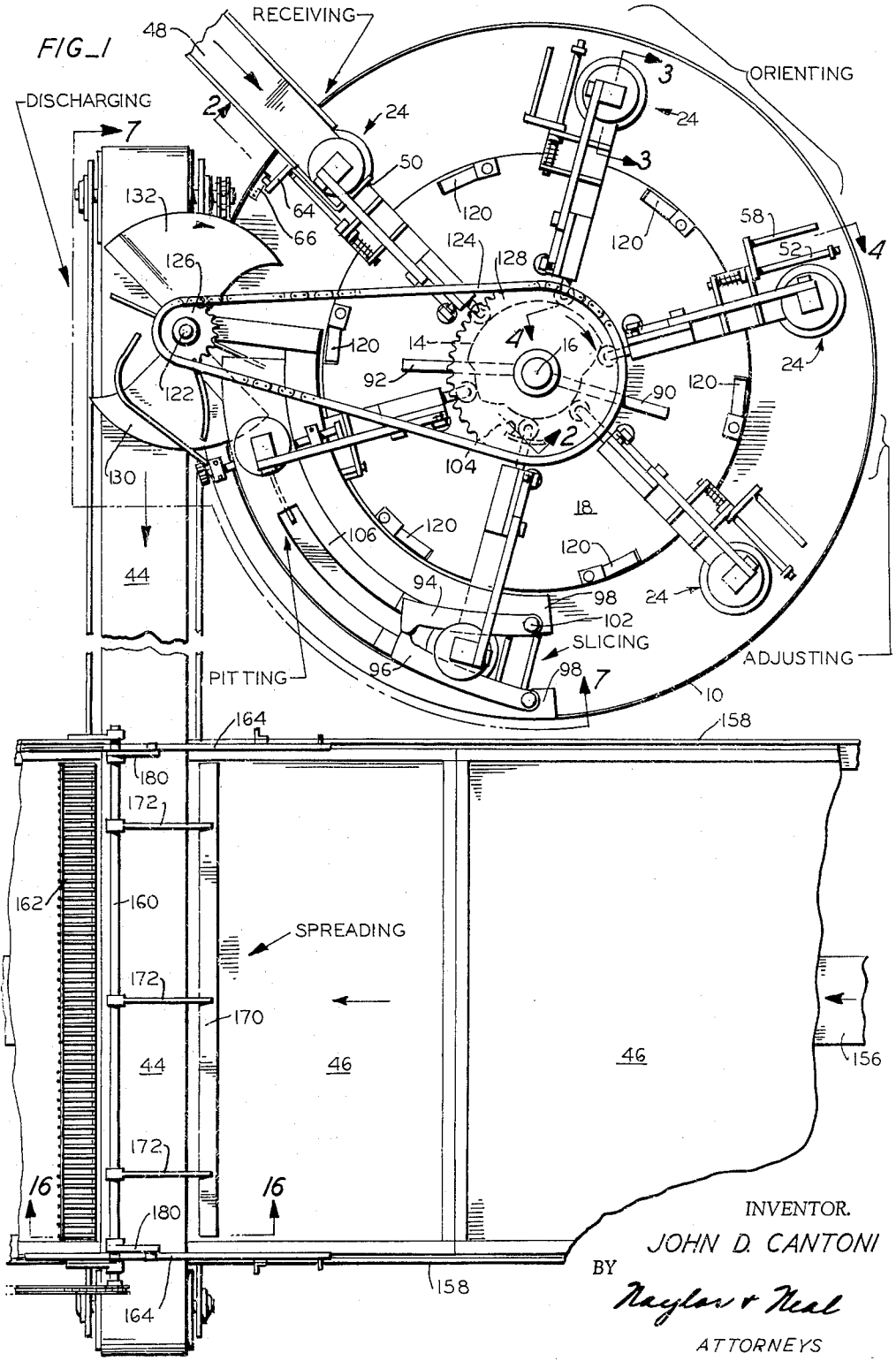

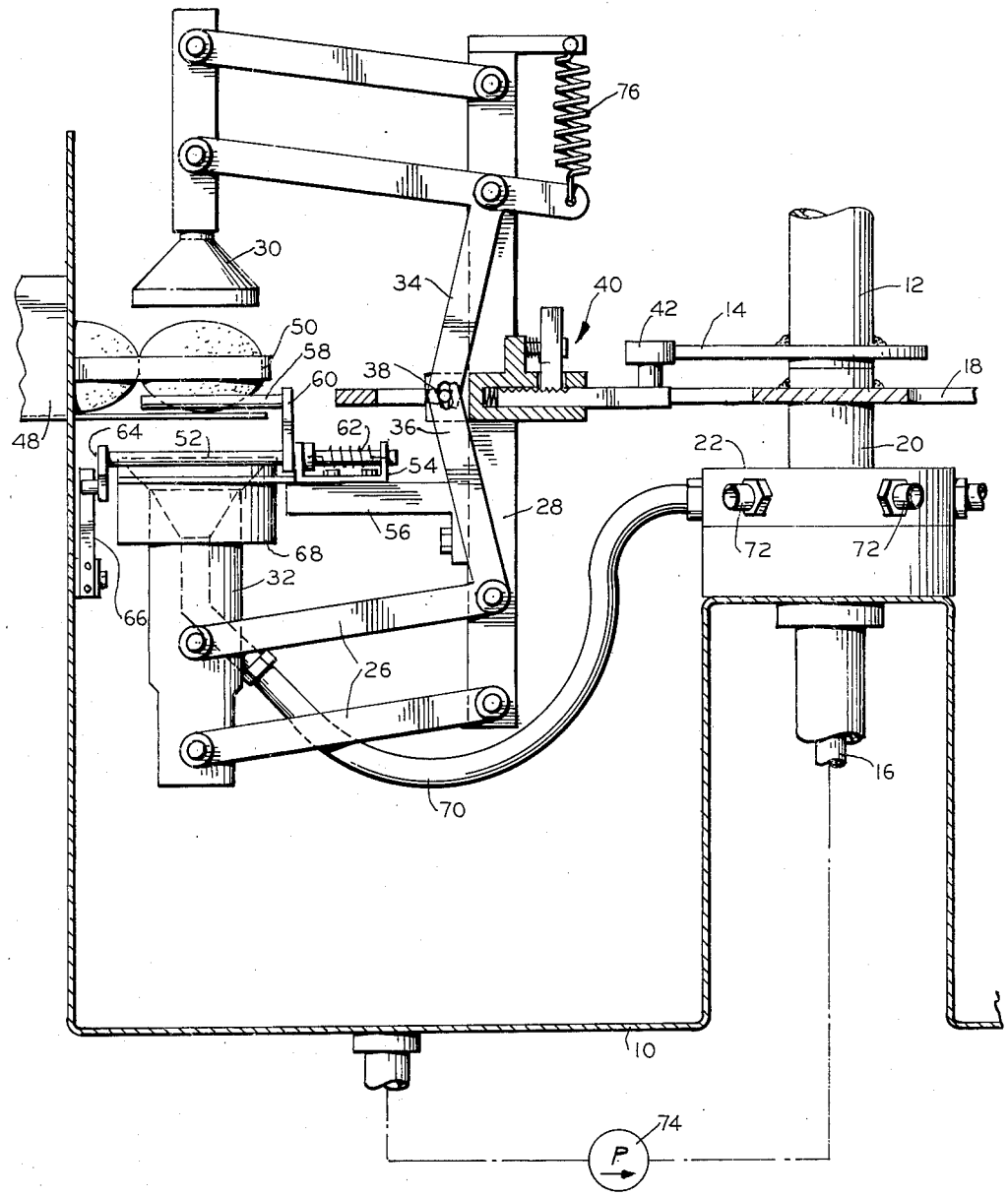

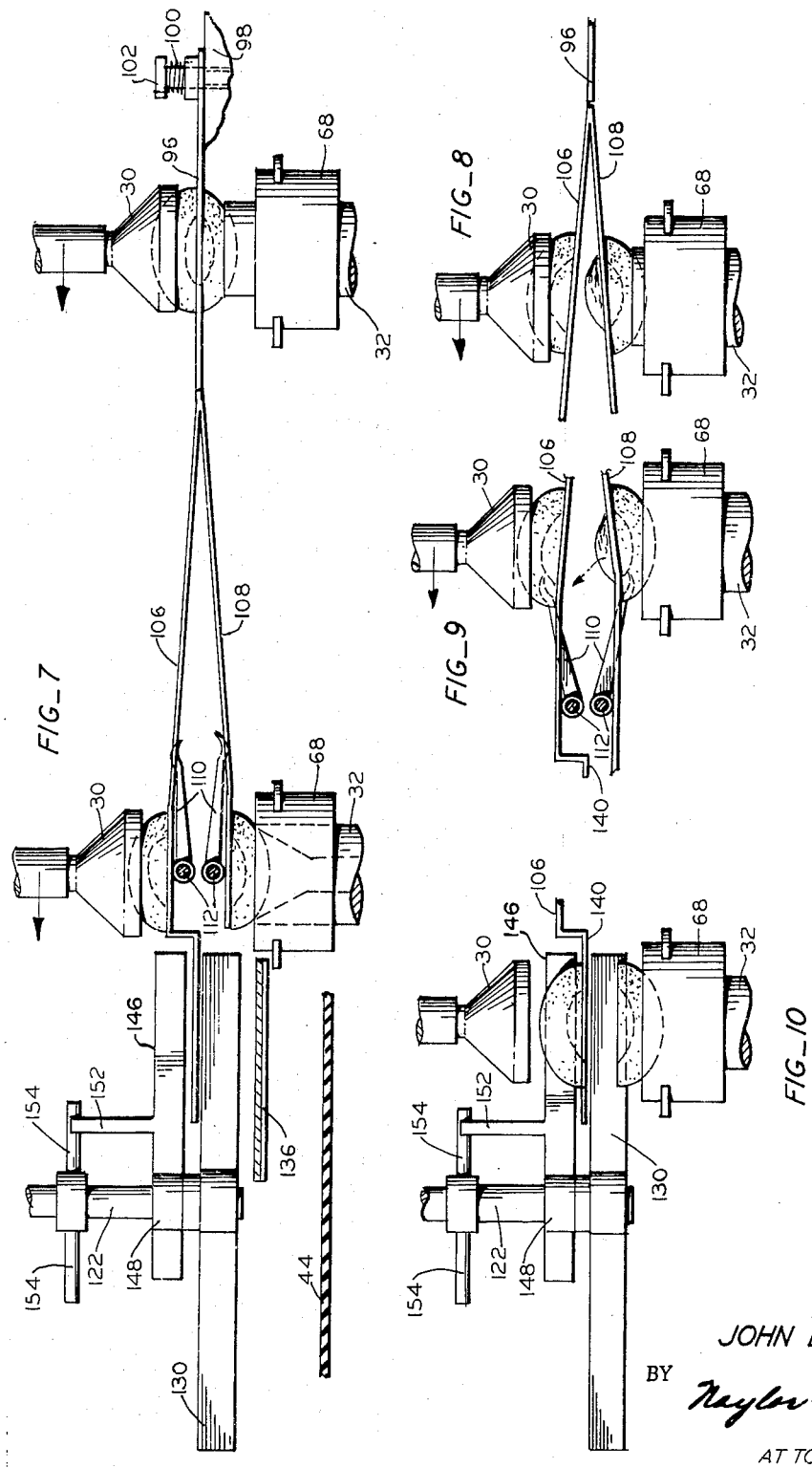

Oct. 19, 1965
J. D. CANTONI
3,212,544
DRUPE HALVING APPARATUS
Filed July 19, 1962
6 Sheets-Sheet 5
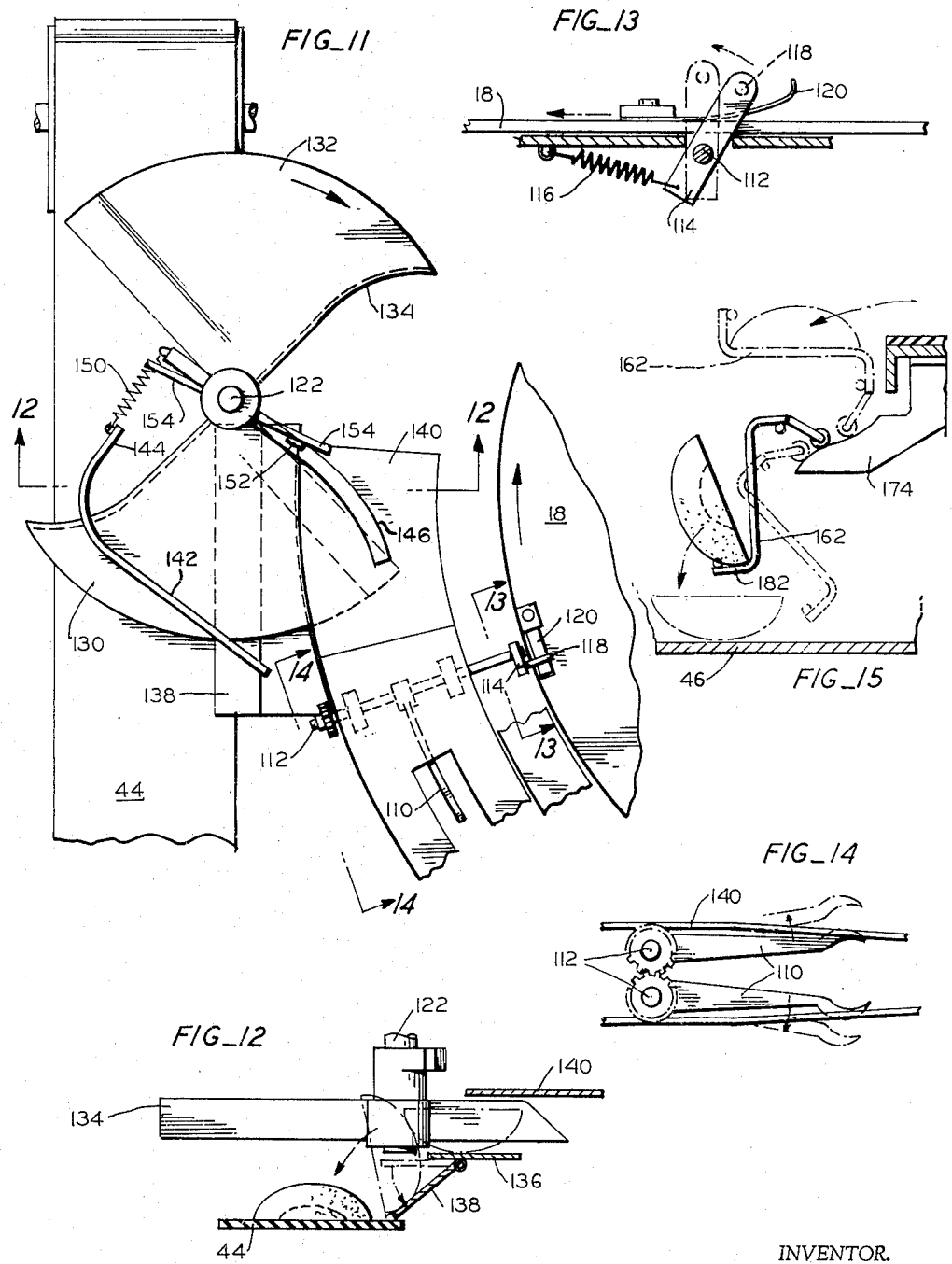
INVENTOR.
JOHN D. CANTONI
BY Naylor + Neal
ATTORNEYS Oct. 19, 1965  J. D. CANTONI  3,212,544
DRUPE HALVING APPARATUS
Filed July 19, 1962  6 Sheets-Sheet 6
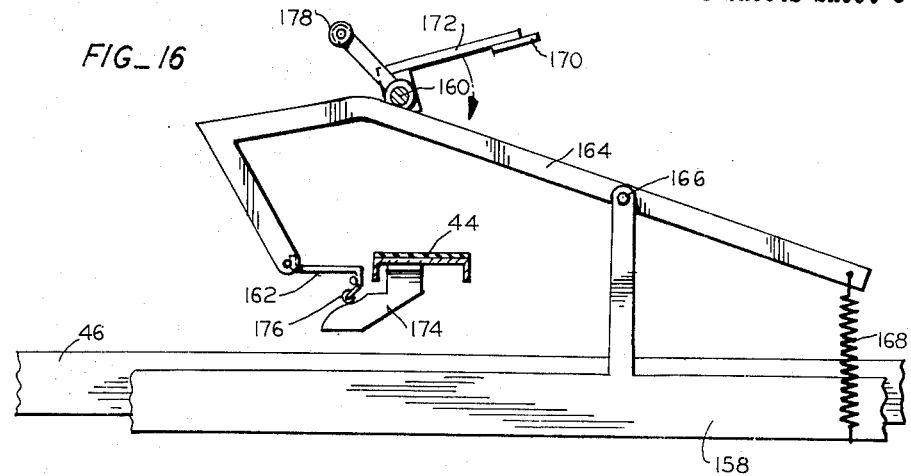
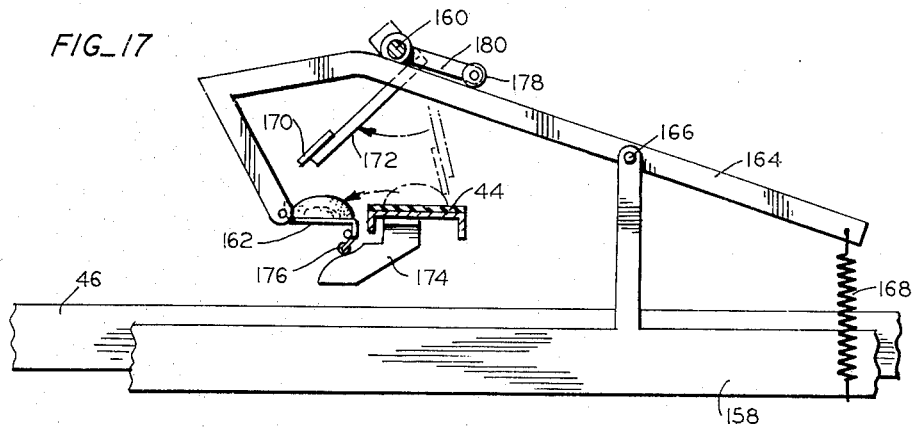
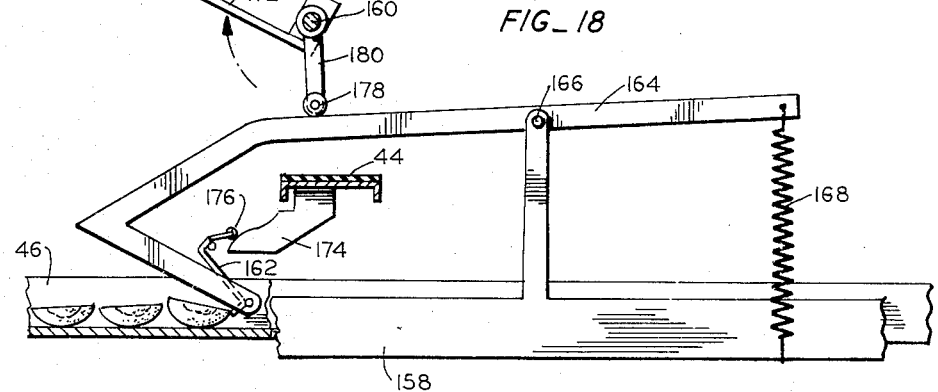
INVENTOR.
JOHN D. CANTONI
BY Naylor + Neal
ATTORNEYS

United States Patent Office 3,212,544
Patented Oct. 19, 1965

3,212,544
DRUPE HALVING APPARATUS
John D. Cantoni, San Jose, Calif., assignor to Sunsweet Growers, Inc., San Jose, Calif., a corporation of California
Filed July 19, 1962, Ser. No. 210,913
2 Claims. (Cl. 146—72)

This invention relates to food processing machinery and more particularly to apparatus for orienting, slicing, and pitting drupaceous fruit and spreading the fruit halves on drying trays.

It is an object of the invention to provide a high speed apparatus for handling drupaceous fruit, and particularly apricots, whereby large volumes of fruit may be processed from a condition of whole fruit at a receiving station to a condition of fruit halves spread on drying trays at speeds heretofore unobtainable.

It is another object of the invention to provide such apparatus which will be capable of complete automatic processing of the fruit from receiving to drying stations.

It is another object of the invention to provide such apparatus which is capable of handling fruit of random size without impairing the speed at which the fruit can be handled.

Other objects and advantages of the invention will become apparent from the following description read in conjunction with the attached drawings in which:

FIG. 1 is a top plan view of apparatus constructed in accordance with this invention;

FIG. 2 is a view in vertical section of the apparatus of FIG. 1 taken at the fruit receiving station of the apparatus a sindicated at the line 2—2 in FIG. 1;

FIG. 3 is a vertical section through one of the fruit holding cups in the orienting station of the machine as indicated at the line 3—3 in FIG. 1;

FIG. 4 is a view in vertical section of one of the pairs of fruit holding cups leaving the orienting station just prior to adjustment of the cup actuating linkage responsive to fruit size as indicated at the line 4—4 in FIG. 1;

FIG. 5 is a fragmentary view of a portion of the apparatus of FIG. 4 as the cup actuating mechanism is being adjusted responsive to fruit size;

FIG. 6 is a sectional view of the apparatus of FIG. 5 taken along the plane 6—6 in FIG. 5;

FIG. 7 is a view in side elevation of the fruit slicing and discharge stations of the apparatus as indicated by the irregular line and arrows at 7—7 in FIG. 1;

FIGS. 8, 9 and 10 show sequential positions of movement of a single pair of fruit holding cups and fruit halves through a portion of the slicing and discharge stations of FIG. 7;

FIG. 11 is a plan view similar to FIG. 1 but on an enlarged scale showing the discharge station of the machine;

FIG. 12 is a view in vertical section taken along the plane 12—12 of FIG. 11 and showing the portion of the apparatus at the discharge station which inverts the lower fruit half as it is discharged from the machine;

FIG. 13 is a view in vertical section taken along the plane 13—13 in FIG. 11 and illustrating the mechanism for actuating the fruit pitting elements;

FIG. 14 is a view in side elevation taken along the plane 14—14 in FIG. 11 and showing the pit removal elements which are actuated by the apparatus of FIG. 13, and FIGS. 15-18 are views in vertical section of the fruit-half spreading apparatus of FIG. 1 with the views being taken along the plane 16—16 in FIG. 1 and with FIGS. 16-18 showing the sequence of steps through which the fruit spreading elements move.

General arrangement

Referring now in detail to the drawings, and particularly to FIGS. 1 and 2, the machine includes a lower stationary housing 10 with a tube 12 (FIG. 2) rigidly mounted on the housing 10 by means of a radial bar located near the top of the machine and not shown in the drawing. A cam 14 is rigidly mounted on the lower end of the tube 12 in fixed relation with the housing 10 and defines a plurality of operating stations circumferentially spaced around the housing. A vertical drive shaft 16 extends upwardly through the housing 10 inside the tube 12 and is driven in rotation by suitable means, not shown, below the housing 10. A turntable 18 is mounted on a sleeve 20 which encircles the shaft 16 just below the cam 14 and is keyed to the shaft 16 for rotation therewith. A rotary water valve 22 is likewise mounted on the sleeve 20 for rotation with the turntable 18.

Plurality of pairs of fruit holding cups 24 are mounted on the turntable 18 circumferentially therearound by means of parallel arm linkages 26 which are attached to vertical posts 28 with the posts 28 being rigidly mounted on the turntable 18. Each pair of cups 24 has upper and lower cups 30 and 32 which are mounted on the parallel arm linkages 26 and are moved toward and away from each other by actuating arms 34 and 36 respectively. The arms 34 and 36 for each pair of cups 24 are provided with notched ends (FIG. 2) which receive a common pin 38. The pin 38 is mounted on a linkage indicated generally at 40 in FIG. 2 and illustrated in greater detail in FIGS. 5 and 6; each linkage 40 carries a cam follower 42 which rolls on the cam 14 to manipulate the cup pairs 24 at different operating stations of the machine.

The drive shaft 16 is driven to rotate clockwise, as illustrated in FIG. 1, so that each cup pair 24 moves around the machine through sequentially positioned stations indicated by the legends in FIG. 1 where a fruit is first received, then oriented with its suture line horizontal, grasped by the cups while the cup actuating linkage is adjusted to the size of the fruit, then sliced along its suture line, then pited, and then discharged onto a conveyer 44. As explained hereinafter, the apparatus at the discharging station of the machine operates to deliver the two fruit halves to the conveyer 44 in single file with their sliced sides facing downwardly onto the conveyer. The conveyer transports the single file line of fruit halves to a spreading station where the fruit halves in a large segment of the single file line are removed from the conveyer simultaneously and spread in a line on a drying tray 46.

The mechanism and fruit handling operations associated with each of these sequential stations are described in detail hereinafter.

Receiving

The fruit receiving station of the machine is illustrated in FIGS. 1 and 2 and includes a supply flume-conveyer 48 through which a single file line of fruit passes in a stream of water. An L-shaped stop 50 is mounted on the end of the flume 48 to retain a piece of fruit in position at the end of the flume 48 until a pair of cups 24 arrives to receive the fruit. A rod 52 is mounted adjacent to each pair of cups 24 on a bracket 54 with the bracket 54 being mounted on an arm 56 which is in turn mounted upon the vertical post 28 which carries the pair of cups 24. A fruit engaging finger 58 is mounted on the rod 52 by an arm 60, and a torsion spring 62 connects the rod 52 to the bracket 54 to spring bias the rod 52 to a rotational position where the finger 58 lies in the same plane as the rod 52 as indicated at the right side of FIG. 1. An operating arm 64 is mounted on the radially outer end of the rod 52 and engages an actuating stop 66 below the flume 48 to rotate the rod 52 as it passes the end of the flume 48 so that the finger 58 is elevated and engages the end fruit in the flume 48 to push it out of the flume 48 and on to the lower cup 32 as the lower cup 32 passes the end of the flume. After each cup pair 24 passes the receiving station at the end of the flume 48, the finger 58 is dropped back to its horizontal position by the spring 62.

Orienting

The apparatus for orienting fruit at the orienting station is illustrated in FIGS. 1–3. It will be noted from FIG. 1 that the cam 14 has its area of maximum radius positioned throughout that angle around the vertical axis of the machine which includes the receiving and orienting stations; the cups 30 and 32 of each pair 24 are held apart by their cam follower 42 rolling on cam 14 while the cup pair passes through the receiving and orienting stations. While the cups are held apart in this area, the upper edge of the lower cup 32 is positioned below the upper edge of a water cup 68 which is mounted on the arm 56. The two cups 32 and 68 are provided with interior conical surfaces as illustrated in FIG. 3 so that they define together a large diameter cup in which the fruit is received and oriented. The recess in the cup 32 is connected at its bottom to a flexible hose 70 which has its other end connected to an outlet 72 in the rotary water valve 22. A pump 74 is connected to circulate water between the bottom of the housing 10 and the rotary water valve 22, and the water valve 22 is provided with sutiable internal parts (not shown) which direct a stream of water through the hose 70 to the lower cup 32 of each cup pair 24 as the cup pair passes through the orienting station. The stream of water delivered to the lower cup 32 is of sufficient volume and velocity that a fruit supported in the cup and lower cup 32 is suspended in an upwardly moving stream of water as illustrated in FIG. 3 so that it is thereby oriented to a position with its suture line lying in a horizontal plane.

After the fruit is thereby oriented, the pair of cups on which it is carried moves out of the orienting station and its cam follower 42 moves off of the area of maximum radius of the cam 14 so that the two cups 30 and 32 move toward each other to grasp the oriented fruit therebetween. As the cup pair leaves the orienting station, the rotary water valve 22 turns off the supply of water to the lower cup 32 of the pair.

Adjusting

The apparatus for adjusting the cup actuating mechanism responsive to the size of fruit held by the cups is shown in FIGS. 1 and 4–6. As indicated above, the movement of the cups 30 and 32 of each pair toward and away from each other is controlled by movement of the pin 38 radially of the machine. The cups 30 and 32 are spring biased to a cup-closed position by a spring 76 which is connected to the parallel arm system 26 of the upper cup 30. Therefore, when the cam follower 42 leaves the area of maximum radius of the cam 14, at the right hand side of FIG. 1, the two cups 30 and 32 are moved together to grasp the oriented fruit therebetween. For reasons that will appear hereinafter, the condition of the cup actuating linkage, at this time, is such that the cam follower 42 is unable to move all of the way to the area of minimum radius of the cam 14, as illustrated in FIG. 4.

As can be best seen in FIGS. 4–6, the cup actuating linkage includes a slider assembly 78 which is mounted in a slot in the turntable 18 for radial movement with respect to the turntable 18. A bar 80 is mounted on the outer end of the slider assembly 78 and carries the pin 38 which engages the forks on the ends of the arms 34 and 36. A bar 82 is slidably received in the slider assembly 78 and has the cam follower 42 mounted on its inner end. A compression spring 84 is mounted in the slider assembly resiliently urging the bar 82 out of the slider assembly to bring the cam follower 42 into engagement with the cam 14. The upper edge of the bar 82 is provided with a series of serrations which are adapted to mesh with a serrated finger 86. The finger 86 is pivotally mounted on the slider assembly 78 and spring biased by a torsion spring 88 to a position where the finger 86 will engage the serrations on the upper side of the bar 82 and lock the bar 82 against movement in the slider assembly 78.

A pair of adjustment actuating bars 90 and 92 are mounted on the sleeve 12 at positions to engage the fingers 86 of each cup pair 24 after the pair leaves the orienting station and just before it enters the receiving station.

As indicated above, the condition of the cup actuating assembly is such when it arrives at the position of FIG. 4 that the cam follower 42 is unable to move radially inwardly into contact with the cam 14. This condition is created when the cup pair passes the actuating member 92 just prior to entering the receiving station. At this position, the finger 86 is unlatched by the member 92 to permit the bar 82 to move completely into the slider assembly 78 while the cam follower 42 moves up the last incline (seen underneath member 92 in FIG. 1) to the area of maximum radius of the cam 14. As the cup pair 24 thereafter enters the receiving station, the finger 86 is released by the actuating member 92 to lock the finger 86 in the serrations on bar 82 and thereby condition the cup actuating linkage to receive fruit of minimum size. After the cup pair 24 leaves the orienting station and closes on an oriented piece of fruit, the cam follower 42 is held away from the cam 14 by increasing distances as increasingly larger fruit above minimum size are received between the cups.

When the cup pair moves past the actuating member 90, the finger 86 is tripped by the actuating member 90 thereby releasing the bar 82 so that compression spring 84 moves the bar 82 out of slider assembly 78 until the cam follower 42 engages the cam 14. Thereafter, when the cup pair 24 moves beyond the actuating member 90, the finger 86 is released and returned to locking engagement with the bar 82 so that the cup actuating mechanism is adjusted responsive to the size of the individual fruit held between the cups.

Slicing

The apparatus for slicing the oriented fruit is shown in FIGS. 1 and 7. At the slicing station, a pair of knives 94 and 96 are mounted on either side of the path of travel of the pair of cups 24. The knives are mounted on plates 98 which are mounted in fixed relation with the housing 10, with the knives 94 and 96 being held on the plates 98 by springs 100 and bolts 102. Springs, not shown, are provided resiliently urging the knives 94 and 96 toward each other so that their hooked ends slice the fruit efficiently all of the way around their periphery and all of the way inwardly to their pits. It should be noted that the fruit are held by the cup pairs 24 in a position such that the knives 94 and 96 slice the fruit centrally along a horizontal plane regardless of the size of the fruit, since the positions of the fruit holding cups 30 and 32 above and below the horizontal plane are determined by the radial position of the same pin 38. It should also be noted that an auxiliary cam 104 (see FIG. 1) is provided to hold the cam followers 42 between itself and the cam 14 as each pair of cups 24 passes through the slicing knives so that the cups 30 and 32 may not be forced apart during high speed travel of a fruit through the slicing station.

As the sliced fruit leaves the slicing station, the two fruit halves move apart along diverging ramps 106 and 108 as their cam follower 42 moves up a corresponding ramp on the cam 14 just prior to pitting the sliced fruit.

Pitting

The apparatus for pitting the sliced fruit is shown in FIGS. 1, 7 and 9 and in detail in FIGS. 11, 13 and 14. The pitting apparatus includes a pair of pit picking fingers 110 which are mounted on the housing of the machine between the ramps 106 and 108 with the ends of the finger 110 being movable through slots in the ramps 106 and 108. The fingers 110 are mounted on pivot shafts 112 which are geared together at their outer ends so that the fingers 110 move in synchronization to pick the pit from either half of the fruit. A manipulating finger 114 (see FIGS. 11 and 13) is mounted on the inner end of the upper rod 112 and spring biased by spring 116 (see FIG. 13) to a position withdrawing the fingers 110 from the path of the fruit halves. The finger 114 is provided with an extension 118 positioned to engage a spring actuator 120 which is mounted on the turntable 18 for each pair of fruit holding cups 24. The spring actuator 120 flips the fingers 110 very rapidly to pick the pit out of either fruit half as a pair of fruit halves pass the pitting station at high speed.

*Discharging*

The apparatus for delivering sliced and pitted fruit halves from the rotary portion of the apparatus to the conveyer 44 is shown in FIGS. 1, 7 and 10–12. This discharged apparatus includes a vertical rotary shaft 122 mounted on the housing 10 adjacent to the path of the fruit holding cup pairs 24 and driven in synchronization with rotation of the turntable by a timing chain 124 entrained over sprockets 126 and 128 mounted on the upper ends of the shafts 122 and 16 respectively. The shaft 122 rotates three times as fast as the shaft 16 and carries at its lower end a pair of diametrically opposed transfer plates 130 and 132. The transfer plates have depending flanges 134 at their leading edges and downwardly sloping upper surfaces at their trailing edges. A tangential stationary plate 136 is mounted along the periphery of the path of the fruit holding cups just below the level of the upper edge of the water cups 68 as best seen in FIG. 7, and a transfer plate 138 is pivotally mounted on the stationary plate 136 adjacent to the edge of the conveyor 44 and pivoted in synchronization with rotation of the shaft 22 by means not shown.

A radial stationary plate 140 is provided at the end of the upper ramp 106 to receive the upper fruit halves after pitting. As indicated in FIG. 7, the transfer plates 130 and 132 rotate between the radial stationary plate 140 and the tangential stationary plate 136 and transfer both the upper and lower fruit halves to the conveyor 44. A curved guide plate 142 is rigidly mounted on the housing 10 of the machine above the conveyer 44 and immediately adjacent to the upper surface of the transfer plates 130 and 132. The guide plate 142 is provided with a curved end 144 for wiping the upper fruit half off of the inclined trailing edge of the transfer plates 130 and 132. An oscillating arm 146 is mounted for free swinging moveemnt on the shaft 122 by a sleeve 148 and is connected to the guide 144 by a spring 150 which resiliently holds it in a position below the level of the path of the upper fruit holding cup. A flat spring 152 is attached to the arm 146 and extends upwardly therefrom to be engaged by actuating members 154 which are mounted on the shaft 122 for rotation therewith.

The transfer plates 130 and 132 move in synchronization with movement of a pair of cups 24 so that the pair of cups enter the space between the two plates 130 and 132 adjacent to the trailing edge of the forward one of the plates. At approximately this position, one of the actuating members 154 on the shaft 122 engages the spring 152 to cause the arm 146 to wipe across the radial stationary plate 140 and thereby wipe the upper fruit half from the radial stationary plate 140 onto one of the transfer plates, for instance 130; when the arm 146 encounters resistance to its motion by engagement of the upper fruit half with the guide 142, the flat spring 152 bends out of engagement with the actuating member 154 so that the arm 146 is returned to its initial position by the spring 150. The upper fruit half on the transfer plate 130 moves with the transfer plate 130 to be wiped off its trailing edge with its cut face down onto the conveyer 44 by the curved portion 144 of the guide 142.

The fruit half on the lower cup of the pair continues on for a short distance and is then engaged by the depending flange 134 on the next rotating transfer plate 132, and this flange moves the lower fruit half onto the tangential stationary plate 136 and hence onto the conveyer 44; as the lower fruit half moves across the tangential stationary plate 136, the transfer plate 138 is pivoted downwardly to facilitate tipping the lower fruit half over to a face down position on the conveyer 44 as illustrated in FIG. 12. In this manner, the upper and lower fruit halves from succeeding pairs of cups 24 are alternately delivered face down on a single file line on the conveyer 44.

*Spreading*

The apparatus for spreading the single file line of fruit halves on drying trays is shown in FIGS. 1 and 15–18. The single file line of fruit halves is conveyed on the conveyer 44 to a position over the drying trays 46 while the drying trays 46 are being moved by a conveyer 156 in a direction perpendicular to the direction of movement of the conveyer 44. The conveyer 156 moves the drying trays 46 over a framework 158 on which a driven rotary shaft 160 is mounted. A transfer plate 162 is positioned parallel and adjacent to the conveyer 44 with the transfer plate 162 being pivotally mounted between the ends of a pair of rocker arms 164 which are in turn pivotally mounted on the framework 58 by pivot pins 166. A pair of springs 168 connect the rocker arms 164 to the framework 158 and resiliently support the rocker arms 164 in a position where they contact the rotating shaft 160.

An elongated wiper blade 170 is mounted on the rotating shaft by a plurality of arms 172 so that the wiper blade 170 is moved across the conveyer 44 to wipe a large segment of the single file line of fruit halves from the conveyer 44 onto the transfer plate 162 as indicated in FIG. 17.

A pair of cam supports 174 are mounted on the under side of the conveyer 44 and support a pair of cam followers 176 which together with the rocker arms 164 support the transfer plate 162 in horizontal position beside the conveyer 44. Suitable springs, not shown, are connected between the transfer plate 162 and the rocker arms 164 to resiliently urge the transfer plate 162 to a position where the cam followers 176 engage the cam supports 174. A pair of rollers 178 are mounted on the shaft 160 by arms 180 so that the rollers rotate about the shaft 160 in fixed position with respect to the wiper 170 so that the rollers 178 engage the rocker arms 164 to move the transfer plate 162 downwardly to the drying tray 46 shortly after the wiper 170 has wiped a line segment of fruit halves onto the transfer plate 162. As the transfer plate 162 is moving downwardly responsive to the action of the rollers 178, the cam followers 176 roll along the cam supports 174 to substantially invert the transfer plate 162 and deposit the line segment of fruit halves on the transfer plate with their sliced sides facing upwardly. It should be noted that the transfer plate 162 is constructed of a plurality of wires extending transversely of the plate and provided with lips 182 (see FIG. 15) on the edges thereof adjacent to the rocker arms 164 to insure that the fruit halves do not slide off of the transfer plate 162 and are in fact inverted as they pass onto the drying tray.

While one specific embodiment of the method and apparatus of this invention has been illustrated and described in detail herein, it is obvious that many modifications of the details disclosed may be made without departing from the spirit and scope of the invention.

I claim:

1. Apparatus for orienting and slicing drupes of random size which comprises:
   (A) a pair of drupe holding cups on opposite sides of a generally horizontal plane,
   (B) drupe slicing means for slicing drupes along said plane and including drupe half separating ramps inclined to said plane on opposite sides thereof, (C) a cam mounted in predetermined spaced relation with respect to said slicing means and having a cam ramp corresponding to said fruit separating ramps and a cam surface spaced from said cam ramp with said slicing means and cam movable in synchronization with respect to said pair of cups.

(D) linkage means connecting said cups together for complementary movement toward and away from said plane while maintaining the cups substantially equally spaced from said plane with said linkage means including
- (1) an operating member of adjustable length,
- (2) a cam follower on said operating member,
- (3) spring biasing means for urging said operating member toward a predetermined length condition in which said cam follower engages said cam, and
- (4) latch means for latching said operating member in a plurality of length conditions, (E) means associated with said lower cup operable when said cam engages said cam surface for orienting a drupe on said lower cup with its suture line horizontal and while said cups are positioned away from said plane, and (F) means for unlatching said latch means when said cam follower is positioned between said cam surdace and said cam ramp.

2. Apparatus for halving drupaceous fruit of random size which comprises:
- (A) a frame having a vertical axis with fruit receiving, orienting, slicing, and discharging stations circumferentially spaced around said axis,
- (B) a turntable mounted on said frame for rotation about said axis,
- (C) a plurality of pairs of drupe holding cups positioned circumferentially around said turntable with each pair of cups having upper and lower cups,
- (D) linkage means mounting said cups of each pair on said turntable for movement toward and away from a horizontal plane while maintaining the cups of each pair substantially equally spaced from said plane and including
  - (1) a movable link adjustable length adapted to be moved in one direction to move the cups of one pair away from said plane,
  - (2) a cam follower on one end of said link for moving said link, and
  - (3) spring means forming a part of said link for urging said link to change in length to move said cam follower in a direction opposite to said one direction, and
  - (4) locking means for locking said adjustable link at a plurality of different lengths,
- (E) control means for said linkage means including
  - (1) a cam engaging the cam followers of all of said linkage means to urge said adjustable links in said one direction as the pairs of cups with which said links are associated pass through said receiving, orienting, and discharge stations and support said cups of said pairs together to grip drupes therebetween as said pairs of cups pass said slicing station, and
  - (2) release means for unlocking and relocking said locking means of each of said linkage means at a station of the cups with which said locking means is associated between said orienting and slicing stations,
- (F) orienting means associated with the lower cup of each pair for orienting a drupe thereon with its suture line horizontal as the pair passes said orienting station, and
- (G) slicing means mounted on said frame at said slicing station for slicing along said horizontal plane drupes held between the cups of said pairs.

References Cited by the Examiner

UNITED STATES PATENTS

| | | | |
|---|---|---|---|
| 2,023,810 | 12/35 | Horner | 416—238 |
| 2,293,121 | 8/42 | Dudley | 198—33 |
| 2,610,724 | 9/52 | Dudley | 198—33 |
| 2,672,229 | 3/54 | Ewald et al. | 198—33 |
| 2,735,465 | 2/56 | Kellogg | 146—72 |
| 2,811,997 | 11/57 | Schmidt et al. | 146—241 |
| 2,832,460 | 4/58 | Lauer | 198—33 |
| 2,858,863 | 11/58 | Lorenzen | 146—72 |
| 2,918,098 | 12/59 | Keesling. | |
| 3,031,065 | 4/62 | French et al. | 198—24 |
| 3,040,862 | 6/62 | Schmermund et al. | 198—24 |

J. SPENCER OVERHOLSER, *Primary Examiner.*